United States Patent Office 3,063,093
Patented Nov. 13, 1962

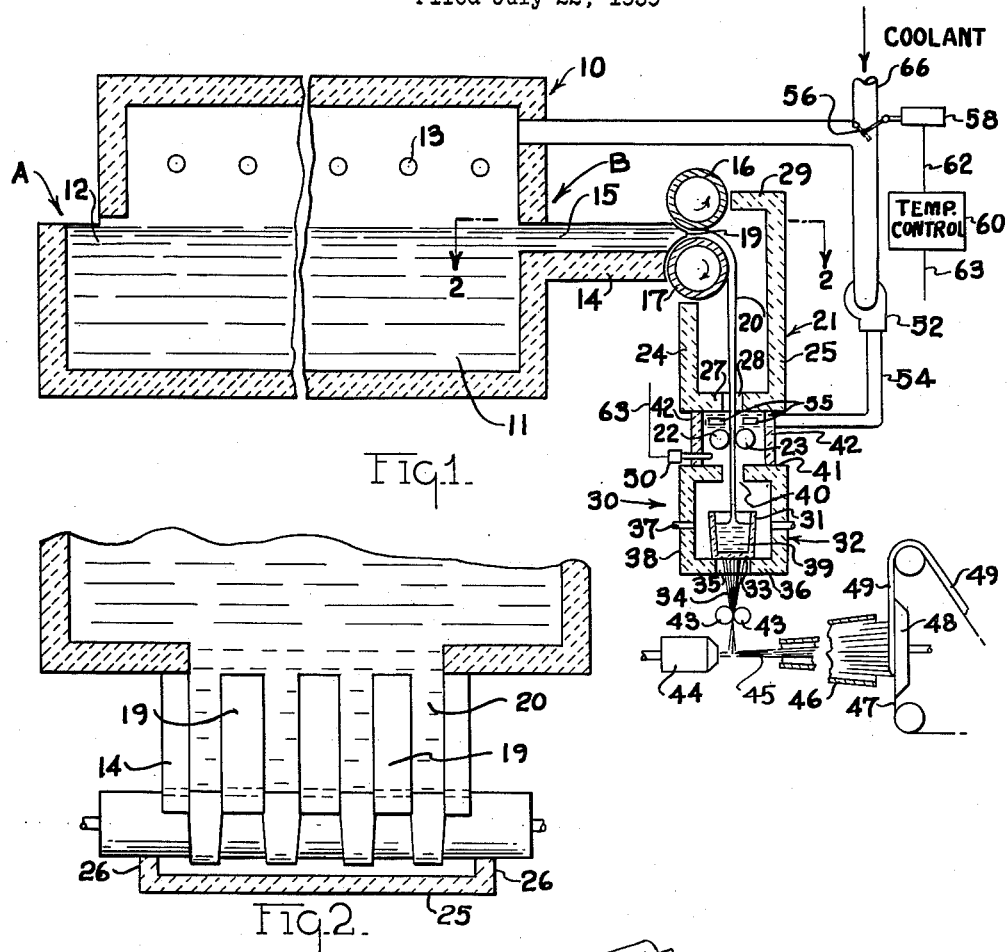
Fig. 1.
Fig. 2.
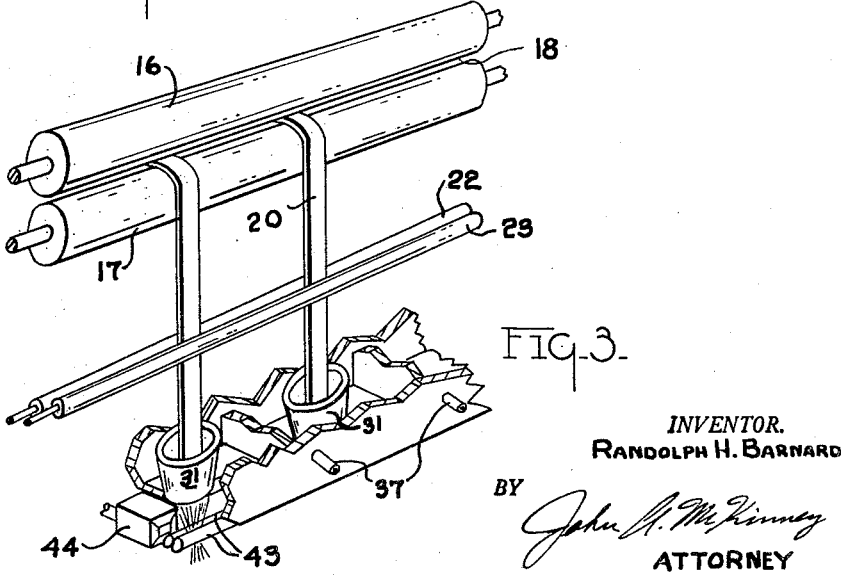
Fig. 3.
INVENTOR.
RANDOLPH H. BARNARD
BY
John M. McKinney
ATTORNEY

3,063,093
METHOD AND APPARATUS FOR PRODUCING
GLASS FIBERS
Randolph H. Barnard, Sylvania, Ohio, assignor to Johns-Manville Corporation, New York, N.Y., a corporation of New York
Filed July 22, 1959, Ser. No. 828,754
9 Claims. (Cl. 18—8)

The present invention relates generally to the production of glass fibers and more particularly to new and useful improvements in method and apparatus for producing glass fibers.

The most commonly used commercial processes for forming fine glass fibers make use of relatively small crucibles for containing molten glass and which are provided with a plurality of orifices from which primary filaments are drawn. After being drawn, the primary filaments are fed endwise into a high velocity, high temperature blast which attenuates them into fine fibers. It has been found necessary to use small crucibles so that the temperature condition of the molten glass within the pot is substantially uniform, at least in its lowermost portions, so that the primary filaments drawn from the orifices are of substantially uniform diameter. Also, it is important, for uniformity of fiber diameter, that the head of the molten glass within the crucible be maintained constant and this is more easily accomplished with small crucibles.

Because of the crucible size, raw glass batch cannot be directly melted therein. One method of supplying the crucibles is to incrementally feed small glass marbles which may be readily melted. This is a costly operation since glass batch materials must be melted in a conventional type glass furnace from which the molten glass is removed or drawn in the form of small globules which are then formed into marbles. The marbles are kept in storage and quantities removed from time to time to satisfy the production demands of the melting crucibles from which the filaments are drawn.

Thus a certain amount of handling cost is incurred in moving the marbles and special equipment must be installed for feeding the marbles to the crucibles. In the event the marble feeding equipment has a malfunction, the head of glass within the crucible materially varies thus affecting the diameters of the primary filaments.

Another method of supplying the crucibles is to directly feed thereto molten glass from the forehearth of a glass melting furnace by means of a plurality of orifices provided in the bottom of the forehearth and controlled by means of needle valves. This method has certain objectionable features in that it is difficult to maintain a constant head of molten glass within the crucibles due to flow variations from the orifices as a result of erosion of the orifices and/or valves.

It has also been suggested to flow a plurality of streams from a molten glass supply, flattening the streams into ribbons, mechanically subdividing the ribbons while still in a plastic condition into a plurality of rods, fluidifying the rods and simultaneously drawing the rods into fine filaments. The filaments attenuated directly from such rods are of haphazard and non-uniform diameters. While such filaments may find utility in some applications, they are not suitable for others such as in molding compositions where uniform appearance is critical.

In accordance with the present invention, the above mentioned objections and difficulties as to cost, non-uniformity of supply to the crucibles, maintenance of a constant head of molten glass within the crucible, and uniformity of product are overcome by continuously drawing molten glass from a glass melting furnace in the form of a plurality of uniform ribbons of equal cross sectional area, and feeding the ribbons at a constant rate of speed to a point at which the ends thereof are progressively remelted in a crucible to provide a constant supply of molten glass from which fibers may be attenuated.

It is, therefore, an important object of the present invention to provide an efficient and economical method and apparatus for producing glass fibers.

Another object of the invention is to provide a method and apparatus which is continuous from the point at which glass batch materials are melted to the point of collecting the glass fibers.

A further object of the invention is to provide a method and apparatus for forming glass fibers in which the energy input requirements of the process are maintained at a minimum.

A still further object of the invention is to provide a method and apparatus for simultaneously supplying an identical amount of glass to a plurality of fiber forming stations at which the glass is melted and attenuated into fibers.

Other objects and advantages of the invention will become more apparent during the course of the following description when considered in connection with the accompanying drawings.

In the drawings wherein like numerals are employed to designate like parts throughout the same:

FIG. 1 is a sectional elevation view showing apparatus constructed in accordance with the invention;

FIG. 2 is a fragmentary sectional plan view taken along the line 2—2 of FIG. 1; and FIG. 3 is a perspective view showing apparatus for drawing the ribbons of glass.

Briefly stated the preferred method of the present invention comprises melting raw glass batch materials in a continuous tank-type glass melting furnace, and drawing or rolling molten glass from the furnace in the form of a plurality of relatively thin ribbons of equal size each of which is then continuously fed into a crucible wherein the advancing end thereof is continuously remelted to form a supply of molten glass from which fibers may be drawn or attenuated.

The crucible is preferably of the refractory type and heated by means of products of combustion which are subsequently directed into contact with the ribbons of glass so as to impart additional heat thereto thus decreasing the amount of heat necessary to remelt the advancing ends of the ribbons. In order to conserve the heat of the ribbons and maintain the above referred to products of combustion in contact with the ribbons, their path is preferably enclosed from the time they are formed until they are melted.

Conservation of heat may be further effected by exhausting and directing products of combustion from the melting furnace to the enclosed path of the ribbons. In addition, the temperature within the ribbon enclosure may be controlled by proportioning a fluid coolant with the furnace products of combustion. Such proportioning may be carried out automatically in response to a deviation from a preselected temperature set on a temperature control instrument, which instrument receives a signal indicative of the temperature along the ribbon path as sensed by a temperature measuring device.

With reference now to the drawings and particularly to FIG. 1 there is shown in sectional view a tank-type glass melting furnace 10 for containing a mass of molten glass 11. Glass batch materials are introduced into the doghouse 12 at the charge end A of the furnace and subjected to flames emitted from a plurality of burners 13 positioned along the length thereof. At its discharge end B, the furnace is provided with a trough-shaped lower wall or flow spout 14 over which the molten glass from the mass or supply body 11 flows or is drawn in the form of a relatively thin sheet or stream 15 of substantially uniform depth across its width.

Positioned immediately adjacent the outermost extremity of the spout 14 are water cooled upper and lower driven forming rolls 16 and 17 of the same type as those conventionally used in forming plate glass. These rolls serve to draw the stream of glass 15 from the furnace and, as shown in FIGS. 2 and 3, have their surfaces parallel to one another and are greater in length than the width of the spout 14. Suitable driving means (not shown) is provided for rotating the rolls 16 and 17 at a constant speed in the directions indicated by the arrows in FIG. 1, and the rolls are vertically spaced from one another a distance such that an elongated opening 18 is provided therebetween, which opening defines the major surface areas of the ribbons of glass which are to be drawn therebetween.

It was previously brought out that one of the objects and advantages of the invention was that a plurality of fiber forming stations could be simultaneously and equally fed from a single glass melting furnace. This is accomplished by forming the stream of molten glass 15 into a plurality of equi-sized individual ribbons each of which is then fed to a different crucible. For this purpose and as best shown in FIG. 2, spaced longitudinally extending refractory dividing walls 19 are supported by and joined to the flow spout 14 and extend substantially coextensively in length therewith, thus separating the molten stream 15 into a plurality of individual ribbons 20, each of which is then drawn forwardly and simultaneously engaged by the forming rolls 16 and 17. The dividing walls 19 are laterally spaced from one another an equal distance, and since the plurality of ribbons are fed between the single pair of rolls 16 and 17 each ribbon has an equal cross sectional area and moves at identical rates. While passing between the forming rolls and being formed to their desired cross sectional area, the ribbons 20 are substantially simultaneously chilled and cooled to a dimensionally stable rectangular shape by contact therewith to the extent that they will retain their ribbon like form but yet are at a temperature at which they may be readily bent. Depending upon the glass composition, this temperature should be about 1000° F.

In order to reduce the amount of heat required to remelt the glass ribbons and thus reduce the energy requirements and cost of the process, it is desirable that loss of heat from the ribbons be held to a minimum beginning immediately after they are formed to their dimensionally stable shape. Thus, after passing between the rolls 16 and 17 the ribbons are bent about the roll 17 and drawn downwardly through a refractory enclosure 21 by means of a pair of coacting, driven feed rolls 22, 23 located beneath the enclosure 21. Each of the rolls 22, 23 simultaneously engages opposite surfaces of each of the ribbons 20 and is rotated at a constant lineal speed equal to that of the rolls 16 and 17 by suitable means (not shown).

The enclosure 21 surrounds the path of the ribbons between the drawing and feed rolls and comprises spaced sidewalls 24 and 25 joined to one another by end walls 26. At their lowermost ends the side walls are provided with opposed, inwardly directed lateral portions 27 which terminate a short distance from one another to provide a narrow exit opening in the form of an elongated slot 28 immediately above the rolls 22, 23 through which the ribbons 20 pass. The uppermost end of the wall 24 terminates beneath and immediately adjacent the lower drawing roll 17, and the wall 25 has a rearwardly extending portion 29 which terminates immediately adjacent the upper drawing roll 16.

By enclosing the path of travel of the ribbons after leaving the forming rolls the loss of heat therefrom is restricted and kept at a minimum since initial operation of the process causes the enclosure 21 to become heated and thus heat transfer from the ribbons during subsequent process operation when the ribbons are passing through the enclosure is maintained at a minimum.

Positioned immediately beneath the feed rolls 22, 23 are a plurality of individual fiber forming devices designated generally by the numeral 30 each of which is identical and comprises a circular refractory crucible 31 positioned within a circular combustion chamber 32. The bottom of the crucible is provided with a plurality of orifices 33 from which filaments 34 may be drawn and is disposed above and closes an opening 35 provided in the bottom wall 36 of the combustion chamber 32.

Each crucible 31 is heated by means of a plurality of ports 37 provided within the sidewalls 38 of the combustion chamber and supplied with a suitable mixture of combustible gas which is ignited within the space surrounding the crucible defined by the sidewall thereof and the sidewall of the combustion chamber. The heat thus applied maintains the crucible sidewalls at a sufficient temperature to melt the continuously advancing end of a ribbon 20 of glass which is continuously fed into the molten bath of glass 39 maintained with the crucible through an opening 40 in the top wall 41 of the combustion chamber. After contacting the crucible, the products of combustion are deflected or directed into contact with the ribbon 20 by the top wall 41 and thus serve to preheat the ribbon after which they are exhausted through the opening 40.

Here the products of combustion may be supplemented with products of combustion exhausted from the furnace 10 in accordance with the needs as measured by temperature sensing means in the form of thermocouple 50. The thermocouple 50 is shown to be positioned within wall 42, but it will be understood that it may be positioned anywhere along the enclosed path of the ribbons 20. The products of combustion are directed to the enclosure by means of pump 52 through conduit 54 and openings 55. Within the conduit 54 a positionally adjustable damper 56 is provided to regulate the volume of heating medium or products of combustion, directed from furnace 10. The damper 56 is positioned by means of linkage suitably connected to damper motor 58 which is actuated in response to a signal transmitted through line 62 from the temperature control instrument 60 which receives an impulse representing the temperature as sensed by thermocouple 50 through line 63. If the temperature as sensed by thermocouple 50 is below a preselected set point on control 60, the damper will rotate counter-clockwise to increase the volume of heating medium directed from furnace 10 to the path of the moving ribbons 20. If the temperature as sensed by thermocouple 50 is above the preselected set point on control 60, the damper will rotate clockwise to decrease the volume of heating medium directed from furnace 10.

It is within the contemplation of this invention, where accurate temperature control of each individual glass ribbon is desired, to provide a separate branch conduit extending from conduit 54 for each of the ribbons 20. Individual dampers, similar to damper 56, may also be provided for each of the branch conduits together with appropriate temperature control apparatus to actuate the individual dampers.

As a further control, a cooling medium may be provided through duct 66, suitably connected to conduit 54 in a manner whereby the hot products of combustion may be proportionally tempered with the coolant. With counter-clockwise movement of damper 56 less coolant will be admitted; with clockwise movement more coolant will be admitted.

The glass melting device 30 is more fully disclosed in U.S. Patent No. 2,814,657 issued November 26, 1957, to which reference may be made for a more complete understanding of the construction and mode of operation.

To maintain contact between the exhausted products of combustion and the ribbon 20, the space between the top wall 41 of each combustion chamber 32 and the wall portions 27 of the enclosure 21 is closed by means of upwardly extending, spaced refractory walls 42. These walls serve to prevent heat from the ribbons escaping to the atmosphere and also serve to channel the products of combustion exhausted from the combustion chamber upwardly in contact with the downwardly moving ribbons while within the enclosure 21.

Positioned below the melting apparatus 30 are a pair of the usual filament attenuating rolls 43 for drawing the filaments 34 simultaneously from each of the crucibles at a constant rate and passing them endwise into high velocity, high temperature blasts emitted from burners 44 which blasts serve to attenuate the filaments into fine blown fibers 45. One suitable burner for this purpose is disclosed in Patent 2,489,243 issued November 22, 1949, to Charles Stalego.

The blown fibers from each of the burners are carried in the gaseous blast emitted therefrom through a conventional fiber directing hood 46 and drawn into mat form upon a continuous, foraminous conveyor 47 by means of a suction box 48 positioned adjacent the rear surface of the conveyor. The thus collected mat 49 is drawn upwardly and then downwardly on the rear flight of the conveyor from which it may be lifted and passed through a suitable oven as is well known in the art.

It is preferred in carrying out the method of the invention that a refractory, gas fired crucible be used since, as previously mentioned, the products of combustion may be directed into contact with the ribbons of glass, thus maintaining the temperature thereof at a relatively high value prior to the ends of the ribbons being melted. Also, the use of such crucibles reduces the energy input to the process in terms of cost since it has been found more economical to utilize the gas fired crucibles as compared to resistance heated or induction heated crucibles.

If it is desired to waive the advantages resulting from the use of a refractory crucible the typical resistance heated or induction heated crucibles may be used to melt the ribbons of glass. However, the products of combustion from the furnace may still be utilized in maintaining the heat of the ribbon prior to being melted. Regardless of the type crucible used, each should be heated so that the glass melting capacity is equal; as a result, the constant feed of equal volumes of glass in the form of the ribbons 20, coupled with the drawing of an equal volume in the form of primary filaments 34 in a given time interval results in a constant head of molten glass being maintained in each of the crucibles. Thus the diameter of the primary filaments is maintained substantially uniform and provides for more uniformity of diameters in the blown fibers which in turn provides for improved mat qualities.

From the foregoing description of the method of the invention it will be apparent that the difficulties long encountered by the industry in solving the problem of feeding a plurality of crucibles equally and simultaneously and yet efficiently have been solved by the present invention. By dividing the stream of molten glass passing over the furnace flow spout into a plurality of ribbons of equal width and then passing or drawing each of these ribbons simultaneously through the single pair of drawing rolls, each ribbon as it leaves the rolls has substantially identical dimensions and is traveling at identical speeds as it enters its respective crucible. Thus each crucible is continuously supplied with an identical amount of glass.

Since the ribbons are shielded from the atmosphere during their path of travel from the forming rolls to the crucibles, the heat loss therefrom is maintained at a minimum and thus a lower heat input to the crucibles is made possible. Also, when the gas fired crucibles are used to melt the ribbons of glass the products of combustion are directed upwardly into contact with the ribbons thus again aiding in maintaining the heat input to the crucibles at a minimum.

It is to be understood that the form of the invention herewith shown and described is to be taken as a preferred embodiment of the same, and that various changes may be resorted to without departing from the spirit of the invention or the scope of the subjoined claims.

I claim:

1. A method of forming glass fibers comprising: continuously drawing a stream of molten glass from a supply body; subdividing said stream into a plurality of dimensionally stable ribbons; shielding said ribbons from the atmosphere while feeding each of them to an individual fiber forming crucible; remelting said ribbons into a molten mass; and drawing from the bottom of each crucible a plurality of filaments.

2. A method as defined in claim 1 which further comprises continuously heating the ribbons after they are formed and until they are remelted.

3. A method as defined in claim 2 which further comprises heating each of said crucibles with hot products of combustion to render the glass molten and subsequently directing the products of combustion into contact with the ribbons to preheat said ribbons prior to entering said crucibles.

4. Apparatus for forming glass fibers, comprising: a plurality of crucibles for melting glass, each of said crucibles having a bottom defining a plurality of orifices from which glass fibers are drawn; a glass furnace for melting batch materials and provided with an exit through which glass is drawn in the form of a molten flowable stream; means positioned adjacent said furnace exit for subdividing and advancing the flowable stream into a plurality of individual molten ribbons; forming means engageable with said individual ribbons for shaping said ribbons to an equal cross-sectional area; common feeding means intermediate said forming means and said crucibles for feeding all of said ribbons at a uniform rate of speed; and a thermally insulated tunnel surrounding the path of travel of the ribbons to maintain said ribbons at an elevated temperature.

5. Apparatus for forming glass fibers comprising, in combination: a glass melting furnace containing a bath of molten glass; means for continuously forming a plurality of continuous ribbons of glass from said bath; means for altering the heat content of said ribbons including wall means forming a treating chamber, a source of fluid heat transfer medium, passage means for directing said medium to said chamber, positionable means for controlling the medium admitted into said chamber, thempercature measuring means for measuring the temperature within said chamber at a preselected point along the path of said ribbons, signal transmitting means operatively associated with the temperature measuring means for transmitting a signal indicative of the difference between the temperature as measured by said temperature measuring means and a preselected temperature, and means responsive to signal from said signal transmitting means for selectively and automatically positioning said positionable means whereby the heat transfer to and from said ribbons is controlled; a plurality of fiber forming crucibles for melting and containing glass and from which glass fibers are drawn; and means for continuously advancing said ribbons to individual crucibles.

6. Apparatus for forming glass fibers comprising, in combination: a glass melting furnace containing a bath of molten glass; means for continuously forming a plurality of continuous ribbons of glass from said bath; means for heating said ribbons including wall means forming a heating chamber, a source of heating medium, passage means for directing said medium to said chamber, positionable means in said passage means for controlling the medium admitted into said chamber, temperature measuring means for measuring the temperature within said chamber at a preselected point along the path of said ribbons, signal transmitting means operatively associated with the temperature measuring means for transmitting a signal indicative of the difference between the temperature as measured by said temperature measuring means and a preselected temperature, and means responsive to a signal from said signal transmitting means for selectively and automatically positioning said positionable means whereby the heat transfer effect to the ribbons is controlled; a plurality of fiber forming crucibles from which glass fibers are attenuated; and means for continuously advancing said ribbons to individual crucibles.

7. Apparatus for forming glass fibers comprising, in combination: a glass melting furnace containing a bath of molten glass; means for continuously forming a plurality of continuous ribbons of glass from said bath; means for cooling said ribbons including wall means forming a chamber, a source of cooling medium, passage means for directing said medium to said chamber, positionable means in said passage means for controlling the medium admitted into said chamber, temperature measuring means for measuring the temperature within said chamber at a preselected point along the path of said ribbons, signal transmitting means operatively associated with the temperature measuring means for transmitting a signal indicative of the difference between the temperature as measured by said temperature measuring means and a preselected temperature, and means responsive to a signal from said signal transmitting means for selectively and automatically positioning said positionable means whereby the heat transfer effect from the ribbons is controlled; a plurality of fiber forming crucibles from which glass fibers are attenuated; and means for continuously advancing said ribbons to individual crucibles.

8. Apparatus for forming glass fibers comprising, in combination: a glass melting furnace containing a bath of molten glass and having a burner which emits products of combustion; means for continuously forming a plurality of continuous ribbons of glass from said bath; means for altering the heat content of said ribbons including wall means forming a chamber, passage means for directing at least a portion of said products of combustion to said chamber, positionable means in said passage means for controlling the volume of products of combustion so directed, temperature measuring means for measuring the temperature within said chamber at a preselected point along the path of said ribbons, signal transmitting means operatively associated with the temperature measuring means for transmitting a signal indicative of the difference between the temperature as measured by said temperature measuring means and a preselected temperature, and means responsive to signal from said signal transmitting means for selectively and automatically positioning said positionable means whereby the heat transfer to and from said ribbons is controlled; a plurality of fiber forming crucibles for melting and containing glass and from which glass fibers are drawn; and means for continuously advancing said ribbons to individual crucibles.

9. Apparatus for forming glass fibers comprising, in combination: a glass melting furnace containing a bath of molten glass and having a burner which emits products of combustion; means for continuously forming a plurality of continuous ribbons of glass from said bath; means for altering the heat content of said ribbons including wall means forming a chamber, passage means for directing said products of combustion to said chamber, a source of cooling medium, conduit means for co-mingling said cooling medium with said products of combustion, positionable means in said conduit means for proportionally controlling the volume of products of combustion and the volume of cooling medium admitted into said chamber, temperature measuring means for measuring the temperature within said chamber at a preselected point along the path of said ribbons, signal transmitting means operatively associated with the temperature measuring means for transmitting a signal indicative of the difference between the temperature as measured by said temperature measuring means and a preselected temperature, and means responsive to a signal from said signal transmitting means for selectively and automatically positioning said positionable means whereby the heat transfer to and from said ribbons is controlled; a plurality of fiber forming crucibles for melting and containing glass and from which glass fibers are drawn; and means for continuously advancing said ribbons to individual crucibles.

References Cited in the file of this patent

UNITED STATES PATENTS

| | | |
|---|---|---|
| 1,137,814 | Pazsiczky | May 4, 1915 |
| 2,229,489 | Barnard | Jan. 21, 1941 |
| 2,286,653 | Siegfried | June 16, 1942 |
| 2,286,903 | Dockerty | June 16, 1942 |
| 2,300,736 | Slayter et al. | Nov. 3, 1942 |
| 2,437,685 | Dreyfus | Mar. 16, 1948 |
| 2,448,499 | Swann | Aug. 31, 1948 |
| 2,453,864 | Schlehr | Nov. 16, 1948 |
| 2,465,283 | Schlehr | Mar. 22, 1949 |
| 2,482,071 | Simison | Sept. 13, 1949 |
| 2,495,956 | Cook | Jan. 31, 1950 |
| 2,497,369 | Peyches | Feb. 14, 1950 |
| 2,514,627 | Cook | June 11, 1950 |
| 2,585,496 | Powell | Feb. 12, 1952 |
| 2,596,272 | Moravec | May 13, 1952 |
| 2,635,389 | Toulmin | Apr. 21, 1953 |
| 2,687,599 | Fletcher | Aug. 31, 1954 |
| 2,706,365 | Stalego | Apr. 19, 1955 |
| 2,814,657 | Labino | Nov. 26, 1957 |
| 2,883,798 | Russell | Apr. 28, 1959 |
| 2,949,632 | Kleist et al. | Aug. 23, 1960 |